Oct. 26, 1965     A. E. HETTEEN     3,213,955
POWERED SLED

Filed Dec. 8, 1961                                               2 Sheets-Sheet 1

INVENTOR.
ALLAN E. HETTEEN
BY
*Moore, White & Burd*
ATTORNEYS

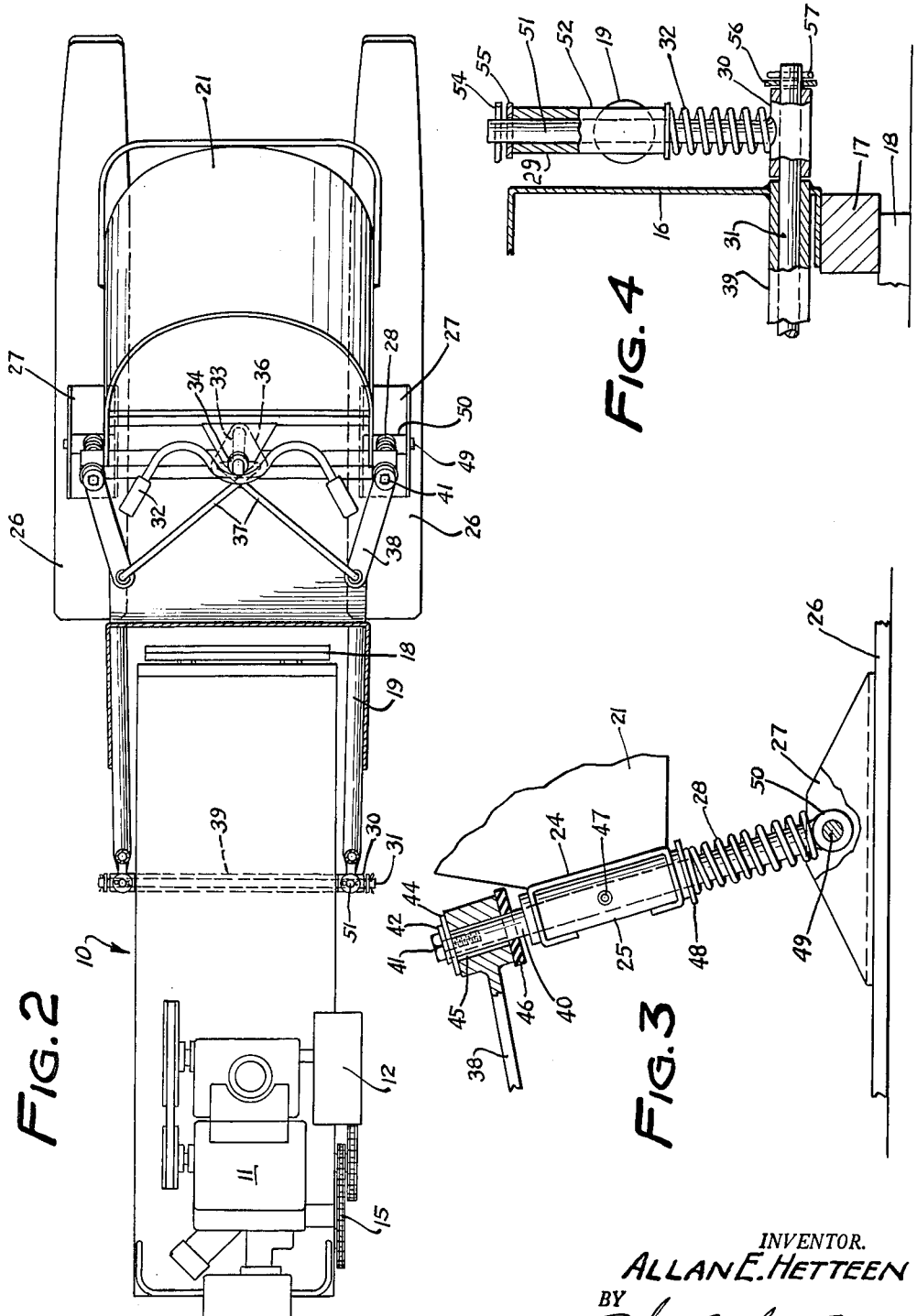

United States Patent Office 3,213,955
Patented Oct. 26, 1965

3,213,955
POWERED SLED
Allan E. Hetteen, Roseau, Minn., assignor to Polaris Industries, Inc., Roseau, Minn., a corporation of Minnesota
Filed Dec. 8, 1961, Ser. No. 157,912
9 Claims. (Cl. 180—5)

This invention is a self-propelled, engine driven sled that is novel particularly in having a novel spring suspension for the body of the sled to provide a more comfortable ride. It is further novel in having a portion thereof supported entirely by the power unit thereby providing good traction in a lightweight unit of this type. It is a further novel feature of this invention to have the propulsion unit extend on either side of a pivotal attachment between it and the passenger compartment, thereby providing for traction of an unusually successful type on uneven ground.

It has been proposed many times in the past to provide a sled type vehicle driven by a power unit of various sorts. Many of these include endless tread or crawler type tractor drive. In most heretofore commercially successful units, however, the entire sled was supported on skis and the drive mechanism operated between a portion of these skis. Furthermore, most of the units previously known have been mounted more or less directly on the skis or when sprung have involved elaborate structures that are rather involved and hence expensive. When making a small and lightweight unit of this general type in which the chief aim is to hold the price at a reasonable level, yet providing a comfortable ride, elaborate spring means is not compatible with price requirements. The structures previously employed are not readily adapted to such lightweight vehicles of this general type.

Accordingly, it is an object of this invention to provide a novel powered sled.

It is another object of this invention to provide a powered sled in which the portion of the sled which carries passengers is spring suspended with respect to those portions of the sled engaging the surface over which it is moving.

It is a further object of this invention to provide a sled of this type in which a portion of the weight of the passenger compartment is carried by a pair of steering skis and the balance thereof is supported directly by a driving mechanism.

It is yet another object of this invention to have the driving mechanism pivoted to the passenger compartment at a point intermediate its ends whereby the weight of the passenger compartment applied thereto is more or less evenly distributed on a driving unit along with the weight of the engine and yet the driving unit is permitted to tip in relation to the steering skis so that the unit can accommodate itself to uneven ground.

It is a further object of this invention to provide a powered sled with a single rod attachment between the power unit and the passenger compartment whereby the removal of the single rod permits disassociation of the members or maintenance.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 2 is a partial top plan view, partial horizontal section taken on the line and in the direction of the arrows 2—2 of FIGURE 1; broken lines again illustrate hidden parts;

Figure 1:
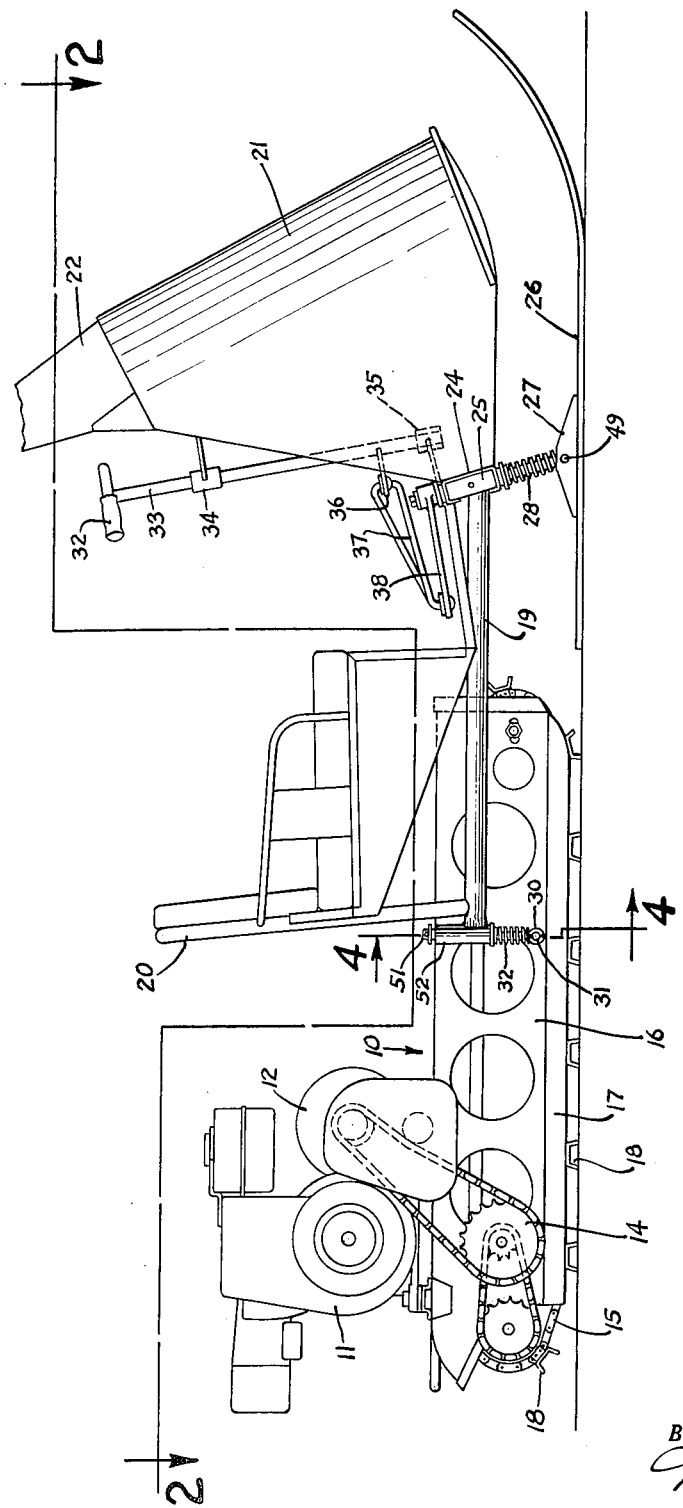
FIGURE 1 is a side elevation of the invention; broken lines illustrate hidden parts.

FIGURE 3 is an enlarged fragmentary side elevation of a portion of the steering skis with parts thereof shown in section to illustrate its construction more fully; hidden parts are shown in broken lines; and FIGURE 4 is an enlarged fragmentary section of the connection between the passenger compartment and the power unit taken on the line and in the direction of the arrows 4—4 of FIGURE 1; broken lines illustrate hidden parts and a portion of the structure is broken away to illustrate construction more fully.

The power unit, generally designated 10, consists of a suitable engine 11 coupled to a transmission 12 which is connected, by means of a suitable speed reduction system such as the chain and sprocket assembly 14, to an endless or crawling tread type driving mechanism 15. A frame 16 supports all these elements in operative relationship to each other. Frame 16 supports skid rails 17 over the highly polished surface of which the cleats 18 of the crawling tread 15 slide.

The passenger compartment has a frame 19 formed of any suitable material, metallic tubes being a good example, on which a suitable seat 20 is secured. The front of frame 19 is surrounded by a protective cowl 21 which extends upward to support a windshield 22.

Intermediate of the ends of the passenger compartment is mounted a channel member 24 within which are appropriately secured, as by welding or the like, the sleeves 25 through which a shaft slidably extends down to the steering skis 26. Brackets 27 on the steering skis pivotally receive in a suitable manner, that will be described in connection with FIGURE 3, a bushing secured to the end of the rod. A spring 28 provides a yielding support for the ski 26 so that shock will be absorbed as the sled moves over uneven surfaces.

A similar sleeve as shown at 29 is secured to the back end of frame 19 and through it extends a shaft 51 that terminates in a bushing 30 through which a rod 31 extends to pivotally connect the power unit 10 to the passenger compartment. A spring 32 provides a yielding connection between the passenger compartment and the power unit so that shocks at this point will also be absorbed.

A suitable steering device such as the handle bar steering rod assembly 33 is provided with stabilizing bushings as shown at 34 and 35. The leverage plate 36 is secured to the rod of assembly 33 at a point between the bearings. Links, as shown clearly at 37, extend out and pivotally engage the steering arms 38. Steering arms 38 are secured to the shafts that are connected to the front steering skis. The details of this structure will be described in connection with the description of FIGURE 3.

In FIGURE 2, the power unit 10 is seen to extend between the rearwardly extending tubular members of frame 19. At 39 in broken lines is shown the tube that is welded to the frame 16 of the power unit through which shaft 31 extends to pivotally connect the power unit in the passenger compartment.

Also shown clearly in FIGURE 2 is the fact that the skis 26 provide a broad, stabilizing stance for the device and are outside the area in which the power unit moves when moving in a straight line direction. The arrangement of the steering mechanism also appears clearly.

Steering links 37 are swivelly connected to a limited degree, both to a leverage plate 36 and also to the steer- the arms 38. The reason for this is that the steering arms 38 are rigidly connected to the shaft that extends to the steering skis. This is necessary for steering purposes and as the skis yield to shocks with the compression of spring 28, the steering arms 38 move up and down. The swivel connection of links 37 with the steering arms 38 and the leverage plate 36 permits this vertical movement of the steering arms without stress or strain on any of the mechainsm.

Turning now to FIGURE 3, a fragment of the steering arm 38 is seen to be secured to the shaft 40 in any suitable manner as by the cap screw 41 extending into suitable threads in the top of shaft 40 with the usual lock washer 42 and plain washer 44 below the head of the cap screw. A key as shown at 45 prevents rotation between the shaft 40 and the steering arm 38. Any suitable means may be employed to prevent the steering arm 38 from dropping down on shaft 40 such as a set screw (not shown) or the like.

Between tube 25 which is shown rigidly secured in channel member 24 and the arm 38 may be extended a resilient washer as shown at 46. To assure free movement both for steering and for shock absorbing purposes, tube 25 may be well lubricated by means of a grease fitting 47. On shaft 40 and below tube 25 is another plain washer 48 and below that is spring 28.

As shown clearly in this figure, the bracket 27 receives a pin 49 that extends through a sleeve 50 which is rigidly secured to shaft 40. In this manner, ski 26 is pivotally secured to the end of shaft 40 so that its forward end may tip up and down with relation to shaft 40 as the sled goes over minor obstructions in the surface over which it is travelling. It also appears clearly in both FIGURE 1 and FIGURE 3 that tube 25 is slanted rearwardly to thereby allow easier sliding movement of shaft 40 within the tube 25 to absorb shocks engaged by the slid in forward travel. As each of the forward runners is provided with this shock absorbing supporting structure, they are independently suspended with respect to shocks and provides much better riding qualities to a lightweight unit such as that disclosed herein, than is true when the runners are secured to the sled with steering movement as the only motion between the runner and the sled proper. Furthermore, since the two front runners are independently suspended if one runner engages higher ground so that the majority of the weight of the sled and passengers tends to be supported by that one ski, its spring 28 will yield thus allowing the other ski to absorb a greater share of the load without necessarily tipping the sled to do so.

Turning now to FIGURE 4, a fragment of tube 39 is shown secured suitably as by welding to frame 16. Shaft 31 also appears clearly extending through the bushing 30 that is secured to a shaft 51. Shaft 51 extends upwardly through sleeve 52 and is retained in the sleeve 52 by any suitable means here shown as cotter pin 54 on top of a plain washer 55. Spring 32 extends between the tube 52 which is part of frame 19 and the sleeve 30 to provide shock action between the rear end of the frame and the power unit.

Shaft 31 is retained between the sleeve 30 shown in FIGURE 4 and its counterpart on the opposite side of the sled by suitable means such as the plain washer 56 and a cotter pin 57. As this is the only connection between the rear of the passenger supporting compartment or body of the unit and the power unit, the removal of the cotter pin 57 permits shaft 31 to be drawn out of the sleeve 30 and tube 39 which disconnects the power unit from the body.

It is apparent that many modifications and variations of this invention as hereinbefore set forth may be made without departing from the spirit and scope thereof. The specific embodiments described are given by way of example only and the invention is limited only by the terms of the appended claims.

What is claimed:
1. A powered sled comprising:
 (A) a power unit frame,
 (B) an engine
   (1) mounted on said power unit frame,
 (C) an endless tread
   (1) movably mounted on said power unit frame for
   (2) engaging a surface,
 (D) means for operatively connecting said engine to said endless tread,
 (E) a tube
   (1) secured to said frame and
   (2) extending transversely thereacross,
 (F) a long shaft
   (1) extending through said tube,
 (G) bushings
   (1) embracing the ends of said long shaft
   (2) beyond said tube,
 (H) stub shafts
   (1) secured to said bushings and
   (2) extending vertically therefrom,
 (I) springs
   (1) surrounding said stub shafts and
   (2) engaging said bushings,
 (J) sleeves
   (1) slidably engaging said stub shafts
   (2) above said springs,
 (K) means for retaining said stub shafts in said sleeves,
 (L) a passenger compartment
   (1) having a frame,
   (2) the rearmost portions of which are secured to said sleeves.
2. The powered sled of claim 1 in which
 (M) skis are provided upon said compartment
   (1) near end thereof remote from that secured to said power unit frame,
 (M) said skis are
   (1) slidably secured to said passenger compartment
   (2) at a point remote from said power unit frame,
 (N) ski springs
   (1) interposed between said skis and said passenger compartment.
3. The powered sled of claim 2 in which
 (M) said skis are:
   (3) supported by ski stub shafts,
 (N) said ski springs
   (2) embrace said stub shafts
 (O) ski sleeves
   (1) secured to said passenger compartment,
   (2) embracing said ski stub shaft above said ski springs.
4. The powered sled of claim 3 in which
 (O) said ski sleeves
   (3) slant rearward from bottom to top.
5. A powered sled comprising:
 (A) an endless tread type power unit,
 (B) a passenger compartment
   (1) having steering skis at its forward end,
 (C) a pivotal connection
   (1) interconnecting said power unit and said passenger compartment,
   (2) at a point on said power unit approximately one-third of the distance toward its rear from its front
   (3) to a point at the rear of said passenger compartment,
 (D) said endless tread type power unit being the sole support for the rear end of said passenger compartment.
6. The powered sled of claim 5 in which
 (C) said pivotal connection comprises:

(2) a cylindrical means secured to said power unit,
(3) a cooperating cylindrical means secured to said passenger compartment,
(4) said cylindrical means cooperating to form a pivotal connection and
(5) means for keeping said cylindrical means engaged.

7. The powered sled of claim 6 in which
(C) said pivotal connection comprises:
(2) said cylindrical means secured to said power unit being a tube embracing a rod,
(3) said cooperating cylindrical means are bushings and
(4) said means for keeping said cylindrical means engaged are means secured to said rod outside of said bushings.

8. A powered sled comprising:
(A) an endless tread type power unit,
(B) a passenger compartment
(1) having steering skis at its forward end,
(C) a pivotal connection
(1) interconnecting said power unit and said passenger compartment,
(2) at a point on said power unit at least as near to the middle of said power unit as it is to one of its ends and nearer one end
(3) to a point at the rear of said passenger compartment,
(D) said endless tread type power unit being the sole support for the rear end of said passenger compartment.

9. A powered sled comprising:
(A) an endless tread power unit,
(B) a passenger compartment
(1) having steering skis at its forward end,
(C) a pivotal connection
(1) interconnecting said power unit and said passenger compartment,
(2) at a point on said power unit approximately one-third of the distance toward its rear from its front,
(3) to a point at the rear of said passenger compartment,
(4) said pivotal connection including
  (a) sleeves secured to said passenger compartment,
  (b) stub shafts pivotally secured to said power unit, slidably engaging said sleeves and,
  (c) springs embracing said stub shaft below said sleeves,
(D) said endless tread type power unit being the sole support for the rear end of said passenger compartment.

References Cited by the Examiner

UNITED STATES PATENTS

| | | | |
|---|---|---|---|
| 817,071 | 4/06 | King et al. | 180—5 |
| 1,068,883 | 7/13 | Frank | 180—5 |
| 1,530,223 | 3/25 | Young | 180—5 |
| 2,346,351 | 4/44 | Bombardier | 180—5 X |
| 2,353,501 | 7/44 | Redling | 280—21 |
| 2,378,111 | 6/45 | Tucker et al. | 180—5 |
| 2,617,659 | 11/52 | Grenier | 280—21 |
| 2,925,873 | 2/60 | Laporte | 180—5 |
| 2,970,662 | 2/61 | Hetteen | 180—5 |
| 3,011,576 | 12/61 | Howes | 180—5 |
| 3,023,824 | 3/62 | Bombardier | 180—5 X |

FOREIGN PATENTS

| | | |
|---|---|---|
| 602,601 | 8/60 | Canada. |
| 610,777 | 12/60 | Canada. |
| 39,543 | 8/24 | Norway. |

A. HARRY LEVY, *Primary Examiner.*

LEO FRIAGLIA, *Examiner.*